(12) United States Patent
Wu et al.

(10) Patent No.: US 11,376,908 B2
(45) Date of Patent: Jul. 5, 2022

(54) MOBILE MECHANISM AND MOBILE ROBOT HAVING SAME, AND MOBILE METHOD

(71) Applicant: GUANGZHOU COAYU ROBOT CO., LTD., Guangzhou (CN)

(72) Inventors: Weixun Wu, Shenzhen (CN); Mengqin Li, Shenzhen (CN); Liguo Ding, Shenzhen (CN); Kai Yang, Shenzhen (CN); Huang Ding, Shenzhen (CN); Zhuobin Zheng, Shenzhen (CN)

(73) Assignee: GUANGZHOU COAYU ROBOT CO., LTD., Guangzhou (CN)

( * ) Notice: Subject to any disclaimer, the term of this patent is extended or adjusted under 35 U.S.C. 154(b) by 153 days.

(21) Appl. No.: 16/598,008

(22) Filed: Oct. 10, 2019

(65) Prior Publication Data
US 2020/0039307 A1 Feb. 6, 2020

Related U.S. Application Data

(63) Continuation of application No. PCT/CN2018/075230, filed on Feb. 5, 2018.

(30) Foreign Application Priority Data

Sep. 1, 2017 (CN) .......................... 201710778260.5

(51) Int. Cl.
*B60G 3/01* (2006.01)
*A47L 9/00* (2006.01)
(Continued)

(52) U.S. Cl.
CPC .............. *B60G 3/01* (2013.01); *A47L 9/009* (2013.01); *A47L 11/24* (2013.01); *B60G 17/02* (2013.01);
(Continued)

(58) Field of Classification Search
CPC .. B60G 3/01; B60G 17/02; B60G 2204/4232; A47L 9/009; A47L 11/24; A47L 2201/00; A47L 11/4072
See application file for complete search history.

(56) References Cited

U.S. PATENT DOCUMENTS

| | | | |
|---|---|---|---|
| 3,380,546 A * | 4/1968 | Rabjohn | B62B 3/001 180/15 |
| 4,513,472 A * | 4/1985 | Wells | A47L 9/009 15/354 |

(Continued)

FOREIGN PATENT DOCUMENTS

| | | |
|---|---|---|
| CN | 102697432 A | 10/2012 |
| CN | 204260679 U | 4/2015 |

(Continued)

OTHER PUBLICATIONS

International Search Report and Written Opinion in corresponding International Application No. PCT/CN2018/075230, dated May 24, 2018, 10 pages.

(Continued)

*Primary Examiner* — Frank B Vanaman
(74) *Attorney, Agent, or Firm* — Bayes PLLC (57) ABSTRACT

A mobile mechanism, a mobile robot having the mobile mechanism and a method for moving the mobile robot are disclosed. The mobile mechanism includes a housing in which a guide portion is provided, a sliding seat mounted on the guide portion and movable along the guide portion, a moving wheel fixed on the sliding seat and partially protruding beyond a surface of the housing, a pressing portion pressing against the sliding seat and moving the sliding seat toward the surface of the housing; and a deformation portion mounted on the housing and connected with the pressing portion, exerting a force for moving the sliding seat towards (Continued)

the surface of the housing through the pressing portion when deformed.

19 Claims, 5 Drawing Sheets

(51) Int. Cl.
    *A47L 11/24*     (2006.01)
    *B60G 17/02*     (2006.01)
    *B60K 7/00*     (2006.01)
    *B60K 17/04*     (2006.01)
    *A01D 34/00*     (2006.01)
    *A01D 101/00*     (2006.01)
    *G05D 1/02*     (2020.01)

(52) U.S. Cl.
    CPC .......... *B60K 7/0007* (2013.01); *B60K 17/043* (2013.01); *A01D 34/008* (2013.01); *A01D 2101/00* (2013.01); *A47L 2201/00* (2013.01); *B60G 2204/4232* (2013.01); *B60G 2500/30* (2013.01); *G05D 1/021* (2013.01); *G05D 2201/0203* (2013.01); *G05D 2201/0208* (2013.01)

(56) References Cited

U.S. PATENT DOCUMENTS

| | | | |
|---|---|---|---|
| 4,612,681 A | 9/1986 | McKinney | |
| 5,036,941 A * | 8/1991 | Denzin | B60G 3/00 180/252 |
| 9,033,079 B2 * | 5/2015 | Shin | B25J 5/007 180/65.6 |
| 2004/0134019 A1 * | 7/2004 | Cipolla | A47L 9/2852 15/340.2 |
| 2006/0005344 A1 * | 1/2006 | Uehigashi | A47L 9/009 15/319 |
| 2009/0071732 A1 * | 3/2009 | Kim | B60G 3/145 180/24.07 |
| 2011/0191976 A1 * | 8/2011 | Yan | A47L 11/4002 15/319 |
| 2012/0181099 A1 * | 7/2012 | Moon | A47L 9/009 180/65.51 |
| 2013/0340201 A1 * | 12/2013 | Jang | A47L 9/009 15/319 |

FOREIGN PATENT DOCUMENTS

| | | |
|---|---|---|
| CN | 104814698 A | 8/2015 |
| CN | 204698461 U | 10/2015 |
| CN | 106618393 A | 5/2017 |
| EP | 2036755 A2 | 3/2009 |
| EP | 2679130 A1 | 1/2014 |
| KR | 101018720 B1 | 3/2011 |

OTHER PUBLICATIONS

Extended European Search Report in related European Application No. 18850520.0, dated Oct. 27, 2020, 8 pages.

* cited by examiner

MOBILE MECHANISM AND MOBILE ROBOT HAVING SAME, AND MOBILE METHOD

CROSS REFERENCE TO RELATED APPLICATION

This application is continuation of International Application No. PCT/CN2018/075230, filed on Feb. 5, 2018, entitled "MOBILE MECHANISM AND MOBILE ROBOT HAVING SAME, AND MOBILE METHOD," which claims priority to Chinese Patent Application No. 201710778260.5, filed on Sep. 1, 2017, both of which are hereby incorporated by reference in their entireties.

BACKGROUND

The present disclosure relates to the field of mobile devices, and particularly to a mobile mechanism that can be used for home cleaning or lawn movement and mobile robots having this mobile mechanism.

As people's demands on life rise, there are more and more robots in the market that serve humans, most of which move by themselves on the work surface, such as cleaning robots used in homes, security robots, commercial service robots such as the public service robots introduced by ECOVACS. In addition, intelligent machines are used to serve for life details in daily life, such as tour guidance and restaurant ordering. All these robots are able to self-move on the work surface, enabling users to enjoy an intelligent life by using smart programs to perform designated functional programs on targets at target locations.

Since the robot needs to move on the working surface, it will inevitably encounter different types of working surface environments, such as concrete floors, wood floors, carpets, etc., which will have some unavoidable obstacles, such as height drop caused by the transition section of some different types of working surfaces, or a threshold, or a cable, or a protrusion that can make the robot inclined to a suspension state when climbing over. This drop or protrusion not only causes the robot to suspend, but also causes the robot to vibrate as it climbs over and affects the electronic components inside the robot.

SUMMARY

In order to solve the technical problems in the background art, the technical solution of the mobile robot provided by the present disclosure is as follows:

a mobile mechanism, comprising: a housing in which a guide portion is provided; a sliding seat mounted on the guide portion and movable along the guide portion; a moving wheel fixed on the sliding seat and partially protruding beyond a surface of the housing; a pressing portion pressing against the sliding seat and moving the sliding seat toward the surface of the housing; and a deformation portion mounted on the housing and connected with the pressing portion, exerting a force for moving the sliding seat towards the surface of the housing through the pressing portion when deformed.

Further, the mobile mechanism comprises: a housing, a sliding seat, a moving wheel, a pressing portion, and a deformation portion, wherein: the housing including an upper housing and a lower housing, and a guide portion provided between the upper housing and the lower housing; the sliding seat mounted on the guide portion and movable along the guide portion between the upper housing and the lower housing; the moving wheel fixed on the sliding seat and partially protruding beyond a surface of the housing and contacting with a working surface; the pressing portion pressing against the sliding seat and moving the sliding seat toward the surface of the housing; and the deformation portion being mounted on the housing and connected with the pressing portion, exerting a force for moving the sliding seat towards the surface of the housing through the pressing portion when deformed.

Further, the guide portion is a guide rail.

Further, the guide rail comprises at least one, and the sliding seat has a sliding block sliding along the guide rail in the guide rail.

Further, the guide portion is a guide post.

Further, an axis of the guide post is perpendicular to a moving surface.

Further, the guide post is disposed between the upper housing and the lower housing.

Further, the guide post comprises two, symmetrically disposed on both sides of the sliding seat.

Further, the guide post comprises three, triangularly distributed on both sides of the sliding seat.

Further, the pressing portion comprises a rotating portion, a first end portion, and a second end portion, the rotating portion being fixed to the housing by a rotating shaft, the first end portion extending from the rotating portion in a direction away from the sliding seat and being connected to the housing through the deformation portion; the second end portion extending from the rotating portion toward the sliding seat and being pressed against the sliding seat.

Further, the sliding seat comprises a body and a transmission portion received in the body, the transmission portion being connected to the moving wheel.

Further, the transmission portion is a transmission gear and/or a transmission shaft.

Further, the transmission portion further comprises a rotating shaft, the rotating shaft being transmittingly connected to the moving wheel.

Further, the sliding seat is further provided with a motor, the motor being transmittingly connected to the moving wheel through the rotating shaft.

Further, the sliding seat further comprises a sliding sleeve slidingly disposed with the guiding post.

Further, the deformation portion is a spring.

A mobile robot, comprising any of the mobile mechanisms.

The mobile robot is a cleaning robot or a mowing robot.

A mobile method of a mobile robot comprising the following steps: (1) a moving wheel being in contact with a working surface, a sliding seat being movably connected with a main body constituting the robot, wherein the main body comprises an upper housing and a lower housing; (2) when moving, lowering the height of the main body from the ground, the sliding seat being in a rising posture on a guide portion; (3) when the sliding seat rises, the pressing portion being pushed up, the rising of the pressing portion driving the deformation of the deformation portion; (4) when the deformation portion is deformed, a force being generated by the pressing portion, forcing the sliding seat to descend, pushing the moving wheel out of the lower housing surface, keeping the moving wheel in contact with the working surface.

Further, the guide portion is a guide rail.

Further, the guide portion is a guide post.

Further, the main body comprises an upper housing and a lower housing, and the guide post is disposed between the upper housing and the lower housing.

Further, the guide post comprises two, symmetrically disposed on both sides of the sliding seat.

Further, the pressing portion comprises a rotating portion, a first end portion, and a second end portion, the rotating portion being fixed to the housing by a rotating shaft, the first end portion extending from the rotating portion in a direction away from the sliding seat and being connected to the housing through the deformation portion; the second end portion extending from the rotating portion toward the sliding seat and being pressed against the sliding seat.

Further, in step (3), when the sliding seat rises, the second end portion of the pressing portion is pushed up, thus the first end portion stretches the deformation portion and the deformation portion generates a pulling force due to being stretched, the pulling force bringing the first end portion closer to one end of the second end portion, while the second end portion giving the sliding seat a downward force, lowing the sliding seat, lifting the moving wheel out of the lower housing, keeping the moving wheel in contact with the working surface.

Compared with prior art, the beneficial effects of the present disclosure are: it can be applied to a mobile robot that moves on different types of working surfaces; when the mobile robot encounters an obstacle, the pressing portion gives a downward force to the sliding seat to make the moving wheel being close to the working surface to the maximum extent, in contact with the working surface to generate friction, enabling the mobile robot to move and leave the obstacle.

BRIEF DESCRIPTION OF THE DRAWINGS

In order to more clearly explain the technical solution of the embodiment of the present disclosure, a brief introduction will be made below on the drawings to be used in the embodiment. It is obvious that the drawings in the following description relate to some embodiments of the present disclosure, and for a person having ordinary skill in the art, other drawings can also be obtained based on these drawings without involving inventive skills.

DETAILED DESCRIPTION

A clear and complete description of the technical solution of the present disclosure will be provided in conjunction with the drawings and a specific embodiment. It is clear that the embodiment described here is only a portion of the embodiments of the present disclosure, not all embodiments. Based on the specific embodiment described in the present disclosure, all other embodiments obtained by a person having ordinary skill in the art without inventive skills shall fall within the scope of protection as defined by the claims of the present disclosure. For example, the guide portion described in the present application may be a guide post or guide rail for guiding the object to move in a predetermined direction, and the sliding seat of the present application reciprocates along the guide portion on the guide portion; another example, in the present application, the deformation portion may be a spring, or a rubber band, or a deformable body having a deformation restorable or elastic function.

Embodiment 1

Figure 1:
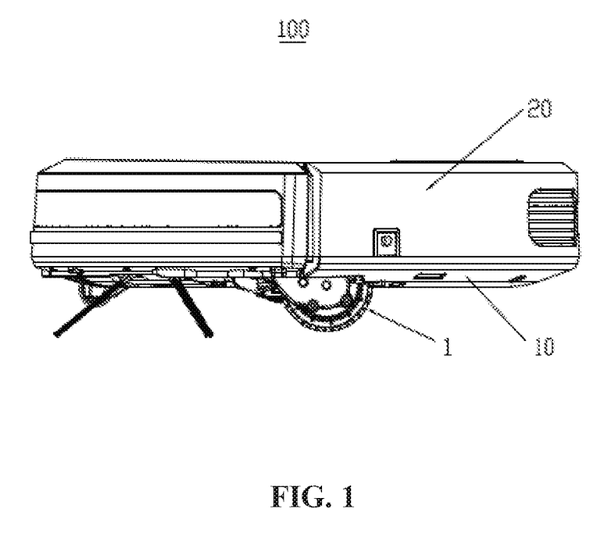
FIG. 1 is a schematic diagram of a cleaning robot of a preferred embodiment of the present disclosure.
Figure 2:
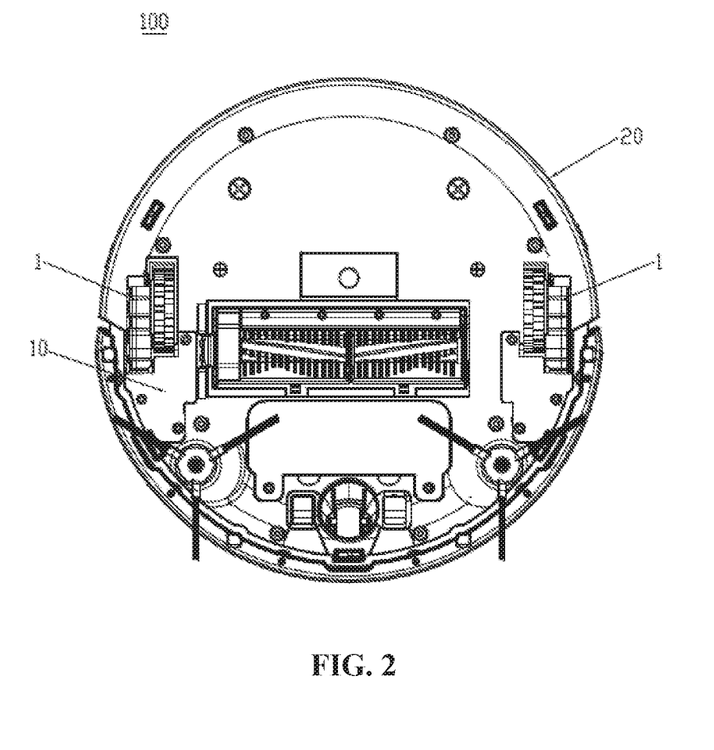
FIG. 2 is a bottom view of the cleaning robot in FIG. 1.

The present disclosure provides a mobile robot that moves by itself on a working surface. Taking the cleaning robot 100 as an example, the structure of the cleaning robot 100 is shown in FIG. 1 and FIG. 2. The cleaning robot 100 comprises a main body constituting an outer shape, and a mobile mechanism 1 that carries the main body to move on the working surface. When the cleaning robot 100 moves on the working surface, the mobile mechanism 1 carries the weight of the main body and other functional components (such as a dust box, a fan, a cleaning component, a control board, a motor, etc.) disposed on the main body. Wherein, the main body comprises a lower housing 10 and an upper housing 20, and the mobile mechanism 1 is as shown in FIGS. 3 to 7.

Figure 3:
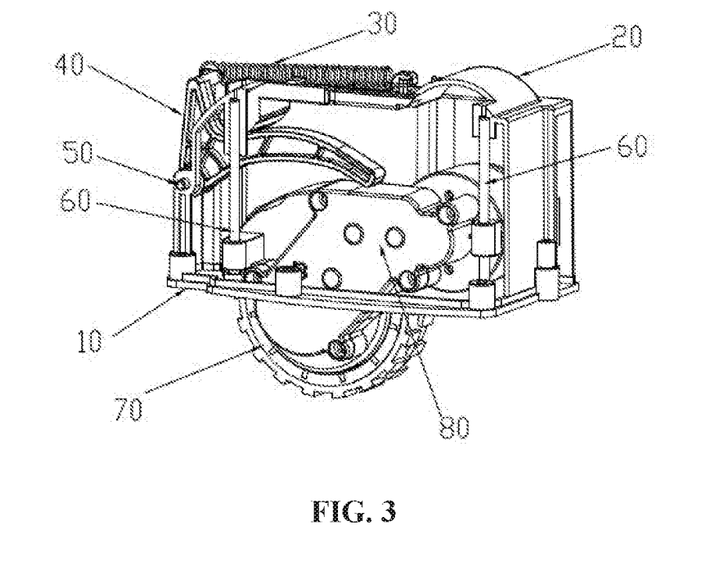
FIG. 3 is a schematic diagram of the mobile mechanism of the cleaning robot in FIG. 1.
Figure 4:
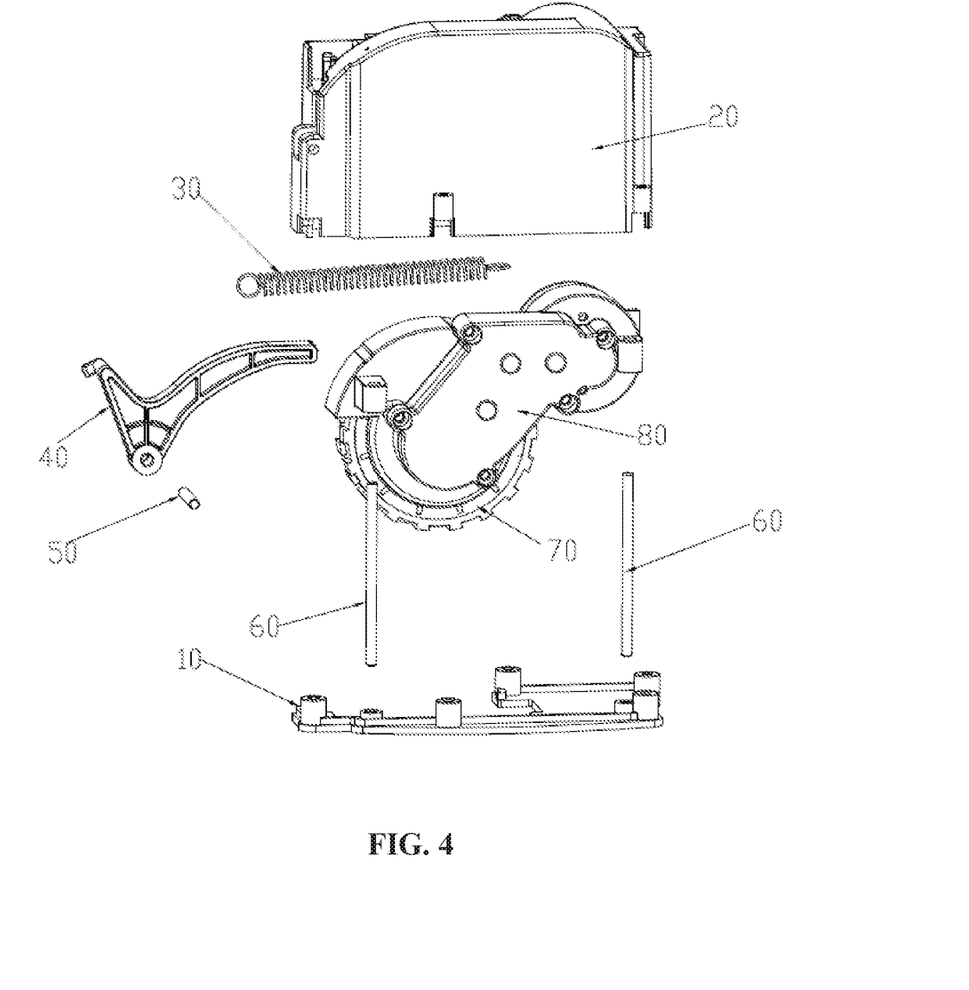
FIG. 4 is an exploded schematic diagram of FIG. 3.

In the present embodiment, as shown in FIGS. 3 and 4, the mobile mechanism 1 comprises: a housing, a sliding seat 80, a pressing portion 40, a moving wheel 70, and a spring 30. Wherein, the housing is composed of a lower housing 10 and an upper housing 20, and two guide posts 60 are symmetrically disposed in the housing, the axis of each guide posts 60 being perpendicular to the moving surface (the working surface over which the cleaning robot moves); the sliding seat 80 is disposed on the guide post 60 and moves between the lower housing 10 and the upper housing 20 along the axial direction of the guide post 60; the pressing portion 40 is connected to the upper housing 20 by the spring 30, and is pressed against the sliding seat 80 by the elastic force of the spring 30, so that the sliding seat 80 moves downward and approaches to the working surface; the moving wheel 70 is fixed on the sliding seat 80 and partially protruding beyond the surface of the lower housing 10 to contact with the working surface.

The housing constituting the mobile mechanism 1 comprises the upper housing 20 and the lower housing 10, wherein the upper housing 20 is integrally formed with the main body, the guide post 60 is disposed between the upper housing 20 and the lower housing 10, the sliding seat 80 is slidably disposed on the guide post 60, the sliding seat 80 is lifted and lowered on the guide post 60 when subjected to an external force. In order to reduce the sway of the sliding seat 80 during movement, the guide post 60 comprises at least two which are respectively disposed at diagonal positions of the sliding seat 80 (as shown in FIGS. 3 to 5) and are symmetrically arranged; the guide post 60 may also comprise three distributed in a triangle, making the sliding seat 80 more uniform when the force is applied and the movement is more stable.

Figure 5:
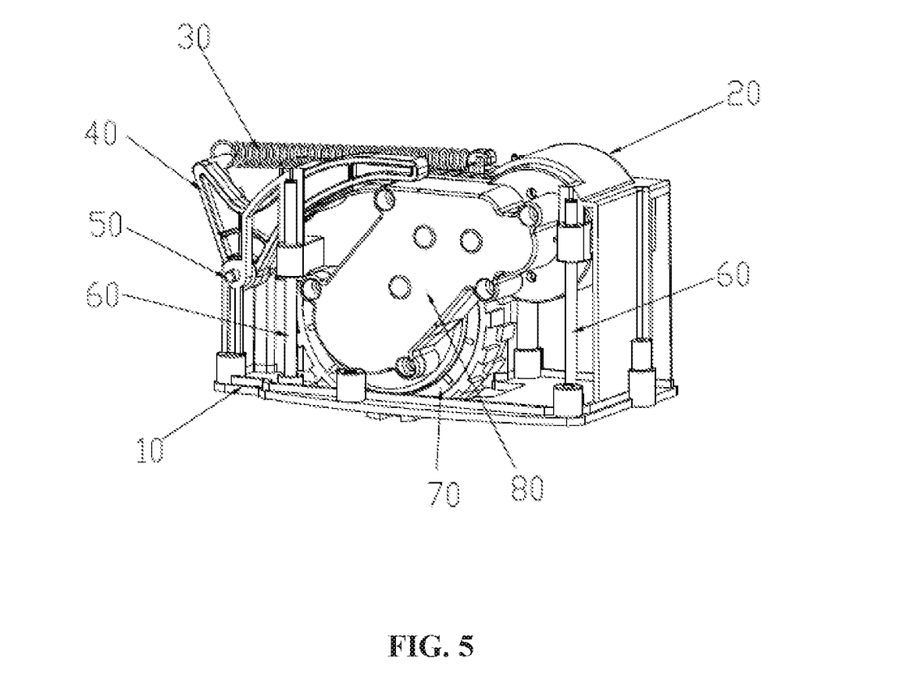
FIG. 5 is a use state schematic diagram of the mobile mechanism of FIG. 3.
Figure 6:
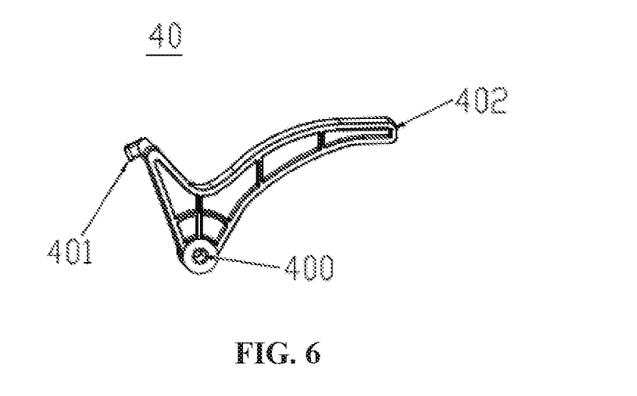
FIG. 6 is a schematic diagram of the pressing portion.

As shown in FIG. 5 and FIG. 6, the pressing portion 40 further comprises a rotating portion 400. The rotating portion 400 is fixed to the upper housing 20 via a rotating shaft 50. The pressing portion 40 has a first end portion 401 and a second end portion 402 that are separated from each other and disposed to extend outwardly at an angle. The first end portion 401 extends from the rotating portion 400 in a direction away from the sliding seat 80 and is connected to the upper housing 20 by the spring 30; the second end portion 402 extends from the rotating portion 400 toward the sliding seat 80 and presses against the sliding seat 80. When the first end portion 401 is pulled by the spring 30, the second end portion 402 can follow to move.

Figure 7:
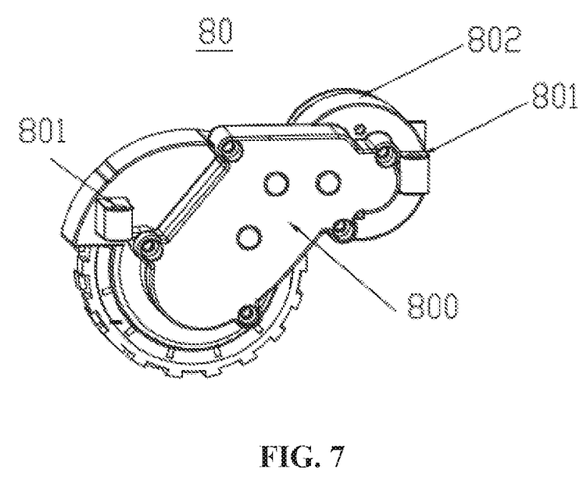
FIG. 7 is a schematic diagram of the sliding seat.

As shown in FIG. 7, the sliding seat 80 comprises a body 800, and a transmission portion (internal member, not shown) housed in the body 800, and the transmission portion is transmittingly connected to the moving wheel 70. Wherein, the body 800 constitutes a cavity in which a transmission gear and/or a transmission shaft working as a transmission portion are disposed.

When the cleaning robot 100 moves on the working surface, the moving wheel 70 is in contact with the working surface, and since the moving wheel 70 needs to carry the weight of the whole machine, while the sliding seat 80 is movably connected with the main body, the weight of the main body forces the height of the main body from the ground to decrease, causing the sliding seat 80 to be in a rising posture on the guide post 60, and the sliding seat 80 pushes up the second end portion 402 of the pressing portion 40 when rising, thereby causing the first end portion 401 to stretch the spring 30, and the spring 30 is stretched to create a pulling force that causes the first end portion 401 to approach to one end of the second end portion 402, while the second end portion 402 provides a downward force to the sliding seat 80, causing the sliding seat 80 to descend, and pushing the moving wheel 70 out of the surface of the lower housing 10 as far as possible so that the main body and the working surface are maintained at a safe distance, which allows the cleaning robot 100 to keep the moving wheel 70 in contact with the working surface when moving over the obstacle, thereby avoiding the moving wheel 70 being suspended.

Further, as shown in FIG. 7, the sliding seat 80 further comprises a sliding sleeve 801 slidably disposed with the guide post 60.

When the guide portion in the present application is a guide rail, the number of the guide rails is at least one, and the sliding seat has a sliding block sliding along the guide rail in the guide rail, and the sliding seat moves in the guide rail by the self-weight of the sliding seat or the sliding seat is subjected to an external force.

Further, the transmission portion comprises a rotating shaft that is transmittingly connected to the moving wheel 70.

Further, as shown in FIG. 7, the sliding seat 80 is further provided with a motor 802. The motor 802 is transmittingly connected to the moving wheel 70 through the rotating shaft, so that the mobile robot can move on the working surface during operation.

Embodiment 2

The present disclosure also provides a mobile method of a mobile robot, comprising the following steps:

(1) a moving wheel being in contact with a working surface, a sliding seat being movably connected with a main body constituting the robot, wherein the main body comprises an upper housing and a lower housing;

(2) when moving, lowering the height of the main body from the ground, the sliding seat being in a rising posture on a guide portion;

(3) when the sliding seat rises, the pressing portion being pushed up, the rising of the pressing portion driving the deformation of the deformation portion;

(4) when the deformation portion is deformed, a force being generated by the pressing portion, forcing the sliding seat to descend, pushing the moving wheel out of the lower housing surface to keeping the moving wheel in contact with the working surface.

In this embodiment, as shown in FIG. 3 to FIG. 7, the main body comprises an upper housing 20 and a lower housing 10, and the guiding portion may be a guide rail or a guide post. When the guiding portion is a guide rail, the number of the guiding rail is at least one, and the sliding seat has a sliding block sliding along the guide rail in the guide rail, and the sliding seat is moved in the guiding rail by the self-weight of the sliding seat or the sliding seat is subjected to an external force; when the guide portion is a guide post, the guiding post is disposed between the upper housing and the lower housing.

Further, in this embodiment, the guide portion is preferably a guide post 60, and further preferably the guide post comprises two guide posts symmetrically disposed on two sides of the sliding seat 80. Of course, the guide post 60 can also comprises three guide posts distributed in a triangular shape, so that the force on the sliding seat 80 is more uniform and the movement is more stable.

Further, in the embodiment, the pressing portion 40 comprises a rotating portion 400, a first end portion 401, and a second end portion 402. The rotating portion 400 is fixed on the upper housing 20 via a rotating shaft 50. The first end portion 401 extends from the rotating portion 400 in a direction away from the sliding seat 80, and is connected to the upper housing 20 through a deformation portion, wherein the deformation portion is a spring 30; the second end portion 402 extends from the rotating portion 400 in the direction of the sliding seat and is pressed against the sliding seat 80. When the first end portion 401 is pulled by the spring 30, the second end portion 402 can follow to move.

Further, when the sliding seat 80 rises, the second end portion 402 of the pressing portion 40 is pushed up, thereby causing the first end portion 401 to stretch the deformation portion, and the deformation portion spring 30 is pulled to generate a pulling force, the pulling force bringing the first end portion 401 closer to one end of the second end portion 402, and the second end portion 402 giving a downward force to the sliding seat 80 to lower the sliding seat 80, keeping the moving wheel 70 in contact with the work surface.

What has been disclosed above are only embodiments of the technical solution of the present disclosure, and the scope of the present disclosure is not limited thereto. Therefore, equivalent variations according to the claims of the present disclosure are still within the scope of the present disclosure.

What is claimed is:

1. A mobile mechanism, comprising:
    a housing in which a guide portion is provided;
    a sliding seat mounted on the guide portion and movable along the guide portion;
    a moving wheel fixed on the sliding seat and partially protruding beyond a surface of the housing;
    a pressing portion pressing against the sliding seat and moving the sliding seat toward the surface of the housing; and
    a deformation portion mounted on the housing and connected with the pressing portion, the deformation portion causing the pressing portion to rotate about a rotating shaft coupled to the housing and generating a force by the pressing portion, to force the sliding seat to descend, pushing the moving wheel out of the housing, and keeping the moving wheel in contact with a working surface,
    wherein a first longitudinal axis of the guide portion and a second longitudinal axis of the deformation portion are not co-located.

2. The mobile mechanism of claim 1, wherein:
the housing comprises an upper housing, a lower housing, and the guide portion between the upper housing and the lower housing;
the sliding seat is disposed between the upper housing and the lower housing; and
the moving wheel is in contact with the working surface.

3. The mobile mechanism of claim 1, wherein the guide portion is a guide rail.

4. The mobile mechanism of claim 3, wherein the guide rail comprises one guide rail, and the sliding seat has a sliding block sliding along the guide rail in the guide rail.

5. The mobile mechanism of claim 1, wherein the guide portion is a guide post.

6. The mobile mechanism of claim 5, wherein an axis of the guide post is perpendicular to a moving surface.

7. The mobile mechanism of claim 5, wherein the housing comprises an upper housing and a lower housing, and the guide post is disposed between the upper housing and the lower housing.

8. The mobile mechanism of claim 5, wherein the guide post comprises two guide posts symmetrically disposed on both sides of the sliding seat.

9. The mobile mechanism of claim 5, wherein the sliding seat further comprises a sliding sleeve slidingly disposed with the guide post.

10. The mobile mechanism of claim 1, wherein:
the pressing portion comprises a rotating portion, a first end portion, and a second end portion;
the rotating portion is fixed to the housing by the rotating shaft;
the first end portion extends from the rotating portion in a direction away from the sliding seat and is connected to the housing through the deformation portion; and
the second end portion extends from the rotating portion toward the sliding seat and is pressed against the sliding seat.

11. The mobile mechanism of claim 1, wherein the sliding seat comprises a body and a transmission portion received in the body, the transmission portion being connected to the moving wheel.

12. The mobile mechanism of claim 11, wherein the transmission portion comprises at least one of a transmission gear or a transmission shaft.

13. The mobile mechanism of claim 11, wherein the transmission portion further comprises a rotating shaft, the rotating shaft being transmittingly connected to the moving wheel.

14. The mobile mechanism of claim 13, wherein the sliding seat is further provided with a motor, the motor being transmittingly connected to the moving wheel through the rotating shaft.

15. The mobile mechanism of claim 1, wherein the deformation portion is a spring.

16. A mobile robot, comprising a mobile mechanism, comprising:
a housing in which a guide portion is provided;
a sliding seat mounted on the guide portion and movable along the guide portion;
a moving wheel fixed on the sliding seat and partially protruding beyond a surface of the housing;
a pressing portion pressing against the sliding seat and moving the sliding seat toward the surface of the housing; and
a deformation portion mounted on the housing and connected with the pressing portion, the deformation portion causing the pressing portion to rotate about a rotating shaft coupled to the housing and generating a force by the pressing portion, to force the sliding seat to descend, pushing the moving wheel out of the housing, and keeping the moving wheel in contact with a working surface,
wherein the mobile robot is a cleaning robot or a mowing robot, and
wherein a first longitudinal axis of the guide portion and a second longitudinal axis of the deformation portion are not co-located.

17. A method for moving a mobile robot, wherein the mobile robot comprises a moving wheel in contact with a working surface, a pressing portion, a guide portion, a deformation portion, and a sliding seat movably connected with a main body comprising an upper housing and a lower housing, the method comprising:
when moving, lowering a height of the main body from the working surface, such that the sliding seat is in a rising posture on the guide portion;
when the sliding seat is in the rising posture, pushing up the pressing portion to cause deformation of the deformation portion; and
when the deformation portion is deformed, causing the pressing portion to rotate about a rotating shaft coupled to the main body and generating a force by the pressing portion, to force the sliding seat to descend, pushing the moving wheel out of the lower housing, and keeping the moving wheel in contact with the working surface,
wherein a first longitudinal axis of the guide portion and a second longitudinal axis of the deformation portion are not co-located.

18. The method of claim 17, wherein:
the pressing portion comprises a rotating portion, a first end portion, and a second end portion;
the rotating portion is fixed to the main body by a rotating shaft;
the first end portion extends from the rotating portion in a direction away from the sliding seat and is connected to the main body through the deformation portion; and
the second end portion extends from the rotating portion toward the sliding seat and is pressed against the sliding seat.

19. The method of claim 18, further comprising, when the sliding seat is in the rising posture:
pushing the second end portion of the pressing portion to rise, such that the first end portion stretches the deformation portion and the deformation portion generates a pulling force due to being stretched; and
bringing the first end portion closer to one end of the second end portion by the pulling force, while giving the sliding seat a downward force by the second end portion to low the sliding seat, lift the moving wheel out of the lower housing, and keep the moving wheel in contact with the working surface.

* * * * *